Sept. 1, 1970 F. W. MACONE 3,526,567
LAMINATED CARD ENVELOPE
Filed April 19, 1967
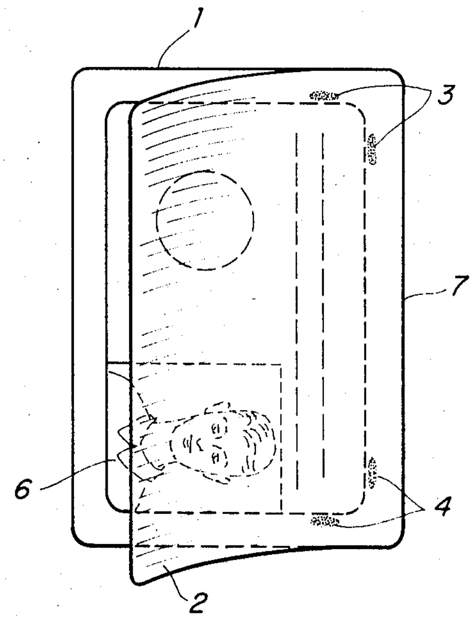
FREDERICK W. MACONE
INVENTOR.
BY Robert L. Nathans
ATTORNEY.

United States Patent Office 3,526,567

Patented Sept. 1, 1970

3,526,567

LAMINATED CARD ENVELOPE

Frederick W. Macone, Carlisle, Mass., assignor to Avant Corporation, Lincoln, Mass., a corporation of Massachusetts Filed Apr. 19, 1967, Ser. No. 632,072

Int. Cl. B32b *3/02*

U.S. Cl. 161—147 10 Claims

ABSTRACT OF THE DISCLOSURE

This disclosure illustrates a novel envelope for receiving and properly orienting a data card positioned within the envelope which is thereafter subjected to heat and pressure to produce a composite, multilayered laminated card.

The present invention relates to a laminated card envelope for facilitating the manufacture of laminated cards.

BACKGROUND OF THE INVENTION

Laminated cards containing printed or pictorial data cards are usually produced by manually orienting the data card with respect to the inside faces of the larger outer plastic sheets which "sandwich" the data card. Generally it is desirable to manipulate the data card so that its edges are parallel to the edges of the outer plastic sheets ad so that the border surrounding the data card is even or symmetrical. Often, before the composite card, bearing the centered data card, is exposed to heat and laminating pressure in the laminator the inner data card changes position to produce an unsightly card or even a ruined one where the data card extends beyond the edges of the outer plastic sheets. Additionally, a given predetermined position of the inner card with respect to the outer plastic sheets is required if the laminated card is to be embossed or coded for automatic data processing reading equipment. The positioning of the inner data card is sometimes further impeded by a moist card (e.g. a photographic print not fully dried) sticking to the inside faces of the outer plastic cards. The envelope of the present invention is constituted so that a moist photographic print may be rapidly inserted and properly oriented without rubbing or being pressed against the inner faces of the plastic sheets which causes abrasion and consequent damaging of the moist emulsion surface. In any event, it is highly desirable, especially for rapid production, to provide means for rapidly and accurately positioning the inner data card with respect to the outer plastic cards in a manner which impedes shifting of the inner card before lamination.

SUMMARY OF THE INVENTION

In accordance with a preferred embodiment of the invention, first and second outer plastic sheets are heat sealed or spot welded to produce a pair of nests each consisting of orthogonally positioned elongated welds, separated by an amount substantially equal to a major dimension (length or width) of the inner data card. The welds or seals couple and maintain the outer sheets in a congruent relationship, while they act as nests to receive and properly orient the inner data card which may be inserted in a second or so. Since the nests lie just outside of the corner edges of the cards they prevent a shift in card position before lamination.

SPECIFIC DESCRIPTION

The figure illustrates outer plastic cards 1 and 2, sealed or welded together by nests 3 and 4 each consisting of elongated, orthogonally positioned seals or welds. L-shaped electrodes may be applied to the congruent cards to heat seal or weld them as shown. The nests are preferably positioned just beyond the corner edges of the inner inserted data card 6 so as to "frame" the card and prevent the aforesaid shifting. The elongated welds or seals making up each nest need not actually intersect, and for that matter need not necessarily be elongated. The outer sheets may be completely separate before being coupled together by the seals or could be formed of a single double sized sheet of plastic folded along edge 7.

The folding of a double sized plastic sheet before insertion of the data card and lamination, with or without the aforesaid nests, is particularly suitable for very high mass production where the outer sheets need not be of different material. In the absence of nests and for certain applications, the fold itself acts to maintain the outer sheets in the proper relationship and may be used to orient the data card where a major dimention of the card, such as its length or width, is positioned against the fold. Also, this approach may be utilized in conjunction with a single spot weld or heat seal. In other words, the length of the card, for example, may be positioned against the fold and its width may be positioned against a single elongated or spot weld.

Obviously, many modifications and variations of the present invention are possible in the light of the above teachings. It is therefore to be understood, that within the scope of the appended claims, the invention may be practiced otherwise than as specifically described.

I claim:

1. A card envelope utilized in the production of laminated data cards comprising:

(a) a first outer sheet;

(b) a second outer sheet capable of being laminated to said first outer sheet; and (c) first and second means for coupling said first sheet to said second sheet and for positioning a third inner sheet between said first and second outer sheets;

said first coupling means being separated from said second coupling means by an amount exactly equal to a major dimension of said third inner sheet inserted between first and second outer sheets;

said first and second coupling means being located with respect to said first and second outer sheets to permit wide separation of large portions of said first and second outer sheets to facilitate rapid and easy insertion of said third inner sheet between said first and second outer sheets.

2. The combination as set forth in claim 1 wherein said first and second means for coupling are oriented to position at least one edge of said third inner sheet parallel to at least one edge of said first and second outer sheets.

3. The combination as set forth in claim 2 wherein said first and second means for coupling comprises a pair of heat seals.

4. The combination as set forth in claim 2 wherein said means for coupling comprises a pair of positioning members which are spaced apart from one another by an amount equal to a major dimension of said third inner sheet so that said third planar media may be readily inserted against said positioning members and will retain a fixed orientation with respect to said first and second outer sheets.

5. The combination as set forth in claim 4 wherein said positioning members consist of portions of fused material formed by heating portions of at least one of said outer sheets.

6. The combination as set forth in claim 5 wherein at least one of said positioning members comprises two elongated heat seals oriented substantially orthogonal to one another.

7. The combination as set forth in claim 5 wherein said first and second outer sheets consist of plastic rectangular sheets capable of being laminated together, at least one of said sheets being transparent to permit viewing of said third inner sheet.

8. The combination as set forth in claim 4 wherein at least one of said positioning members comprises two elongated heat seals oriented substantially orthogonal to one another.

9. The combination as set forth in claim 4 wherein said positioning members comprise heat seals.

10. The combination as set forth in claim 2 wherein said first and second means for coupling consist of portions of fused material formed by heating portions of at least one of said outer sheets.

References Cited

UNITED STATES PATENTS

| | | | |
|---|---|---|---|
| 2,275,579 | 3/1942 | Yanes | 156—277 X |
| 2,767,756 | 10/1956 | Niles | 156—290 X |
| 3,283,713 | 11/1966 | Wooster | 40—2.2 X |
| 3,388,661 | 6/1968 | Decof | 156—213 X |

JOHN T. GOOLKASIAN, Primary Examiner

R. A. KILLWORTH, Assistant Examiner

U.S. Cl. X.R.

40—2.2; 229—68; 161—39